(12) United States Patent
Mironov et al.

(10) Patent No.: US 9,678,405 B2
(45) Date of Patent: Jun. 13, 2017

(54) SYSTEM AND METHOD FOR HIGH-INTENSITY ULTRASHORT PULSE COMPRESSION

(71) Applicants: INSTITUT NATIONAL DE LA RECHERCHE SCIENTIFIQUE, Québec (CA); ECOLE POLYTECHNIQUE PARIS TECH, Palaiseau (FR)

(72) Inventors: Sergey Mironov, Nizhny Novgorod (RU); Efim Khazanov, Nizhny Novgorod (RU); Alexander Sergeev, Nizhny Novgorod (RU); Philippe Lassonde, Montréal (CA); Jean-Claude Kieffer, Montréal (CA); Gérard Mourou, Paris (FR)

(73) Assignees: Institut National de la Recherche Scientifique, Quebec (CA); Ecole Polytechnique Paris Tech, Palaiseau (FR)

( * ) Notice: Subject to any disclaimer, the term of this patent is extended or adjusted under 35 U.S.C. 154(b) by 0 days.

(21) Appl. No.: 14/759,865

(22) PCT Filed: Jan. 6, 2014

(86) PCT No.: PCT/CA2014/050005
§ 371 (c)(1),
(2) Date: Jul. 8, 2015

(87) PCT Pub. No.: WO2014/107804
PCT Pub. Date: Jul. 17, 2014

(65) Prior Publication Data
US 2015/0357784 A1    Dec. 10, 2015

Related U.S. Application Data

(60) Provisional application No. 61/750,618, filed on Jan. 9, 2013.

(51) Int. Cl.
*G02F 1/35* (2006.01)
*H01S 3/00* (2006.01)
*G02B 27/09* (2006.01)

(52) U.S. Cl.
CPC ......... *G02F 1/3501* (2013.01); *G02B 27/095* (2013.01); *G02B 27/0927* (2013.01);
(Continued)

(58) Field of Classification Search
CPC .......... G02F 1/35; G02F 1/3501; G02F 1/355; G02F 2001/3528; G02B 27/0927; G02B 27/095; H01S 3/0057
See application file for complete search history.

(56) References Cited

U.S. PATENT DOCUMENTS

| 4,588,957 A | 5/1986 | Balant et al. |
| 5,956,173 A | 9/1999 | Svelto et al. |

(Continued)

OTHER PUBLICATIONS

Akturk, S. et al., "High-energy ultrashort laser pulse compression in hollow planar waveguides", Optic Letter (2009) vol. 34 No. 9, 1462-1464.

(Continued)

*Primary Examiner* — Daniel Petkovsek
(74) *Attorney, Agent, or Firm* — Barnes & Thornburg LLP; Joan T. Kluger

(57) ABSTRACT

A system comprising a laser emitting an ultrashort pulse beam; and a dielectric bulk medium having a refractive index depending on intensity, the bulk medium broadening the laser beam homogeneously versus transversal spatial coordinates, and a method for compressing high energy femtosecond laser pulses, comprising propagating the laser beam inside a dielectric bulk medium having a refractive index depending on the beam intensity, the bulk medium broadening the laser beam homogeneously versus transver- (Continued)

sal spatial coordinates; and compressing a resulting broadened spectrum.

10 Claims, 11 Drawing Sheets

(52) U.S. Cl.
CPC .............. *G02F 1/35* (2013.01); *H01S 3/0057* (2013.01); *G02F 2001/3528* (2013.01); *G02F 2203/26* (2013.01)

(56) References Cited

U.S. PATENT DOCUMENTS

| | | | |
|---|---|---|---|
| 8,116,340 B2* | 2/2012 | Wise | G02F 1/3511 372/21 |
| 8,284,478 B2* | 10/2012 | Tempea | H01S 3/0057 359/332 |
| 8,310,749 B2* | 11/2012 | Mottay | H01S 3/0057 359/337.1 |
| 8,760,661 B2* | 6/2014 | Cui | H01S 3/10 356/450 |
| 8,798,108 B2* | 8/2014 | Mourou | H01S 3/0057 359/337.5 |
| 9,219,344 B2* | 12/2015 | Zhang | H01S 3/10 |
| 2010/0020834 A1 | 1/2010 | Wise et al. | |
| 2011/0299152 A1 | 12/2011 | Mourou et al. | |

OTHER PUBLICATIONS

Bahk, S.W. et al., "An Off-Axis, Single-Pass, Radial-Group-Delay Compensator Design Using an Offner Triplet for a Broadband OPCPA Laser", Technical Digest (2013).
Boyd, R.W., Nonlinear Optics (2008), Elsevier, USA.
Dombi, P. et al., "Pulse compression with time-domain optimized chirped mirrors", Optics Express (2005), vol. 13 No. 26, 10888-10894.
Fork, R.L. et al., "Compression of optical pulses to six femtoseconds by using cubic phase compensation", Optics Letters (1987), vol. 12 No. 7, 483-485.
Fourcade D., C. et al., "Post-compression of high-energy femtosecond pulses using gas ionization", Optics Letters (2010), vol. 35 No. 2, 253-255.
Mevel, E. et al., "Extracavity compression technique for high-energy femtosecond pulses", Opt. Soc. Am. B. (2003), vol. 20 No. 1, 105-108.
Mironov, S.Y. et al., "Compression of femtosecond pulses with a Gaussian temporal and spatial intensity distribution", Quantum Electronics (2013), 43 (8), 711-714.
Naumova, N.M. et al., "Relativistic Generation of Isolated Attosecond Pulses in a A3 Focal Volume", Physical Review Letters (2004), vol. 92 No. 6, 063902-1 / 063902-4.
Nisoli, M. et al., "Generation of high energy 10 fs pulses by a new pulse compression technique", Appl. Phys. Lett. (1996), 68 (20), 2793-2795.
Rolland, C. et al., "Compression of high-power optical pulses", J. Opt. Soc. Am. B (1988), vol. 5 No. 3, 641-647.
Schmid, K. et al., "Few-Cycle Laser-Driven Electron Acceleration", Physical Review Letters (2009), 102, 124801-1 / 124801-4.
Shank, C.V. et al., "Compression of femtosecond optical pulses", App. Phys. Lett (1982), 40 (9), 761-763.
Siegman, A. Lasers, University Science Books (1986), USA.
Suda, A. et al., "Generation of sub-10-fs, 5-mJ-optical pulses using a hollow fiber with a pressure gradient", Applied Physics Letters (2005), 86 (11), 111116-1 / 111116-3.
Xiaowei, C. et al., "Generation of 4.3 fs, 1 mJ laser pulses via compression of circularly polarized pulses in a gas-filled hollow-core fiber", Optics Letters (2009), vol. 34 No. 10, 1588-1590.
Yu, T.J. et al., "Generation of high-contrast, 30 fs, 1.5 PW laser pulses from chirped-pulse amplification Ti:sapphire laser", Optics Express (2012), vol. 20 No. 10, 10807-10815.

* cited by examiner

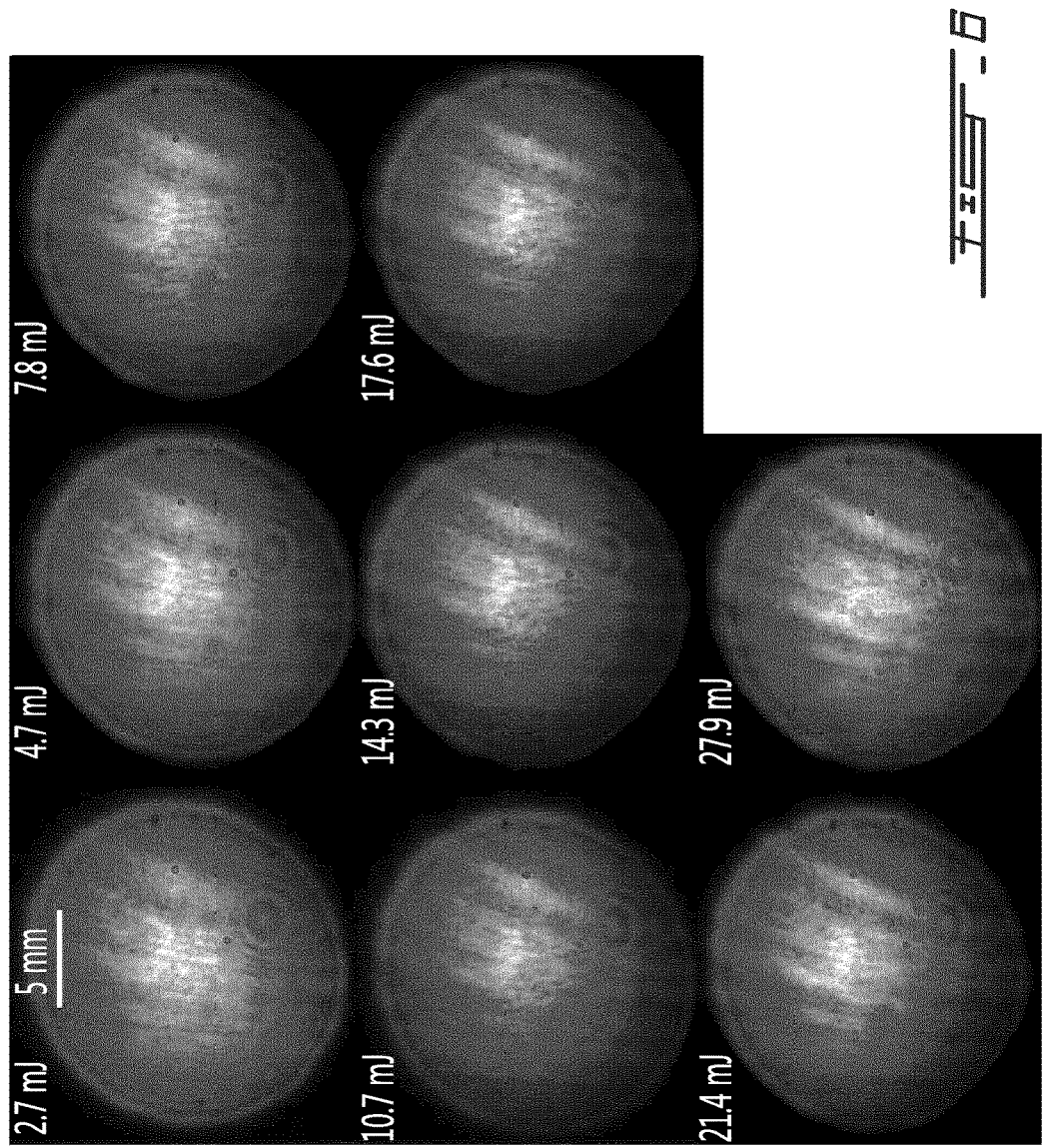

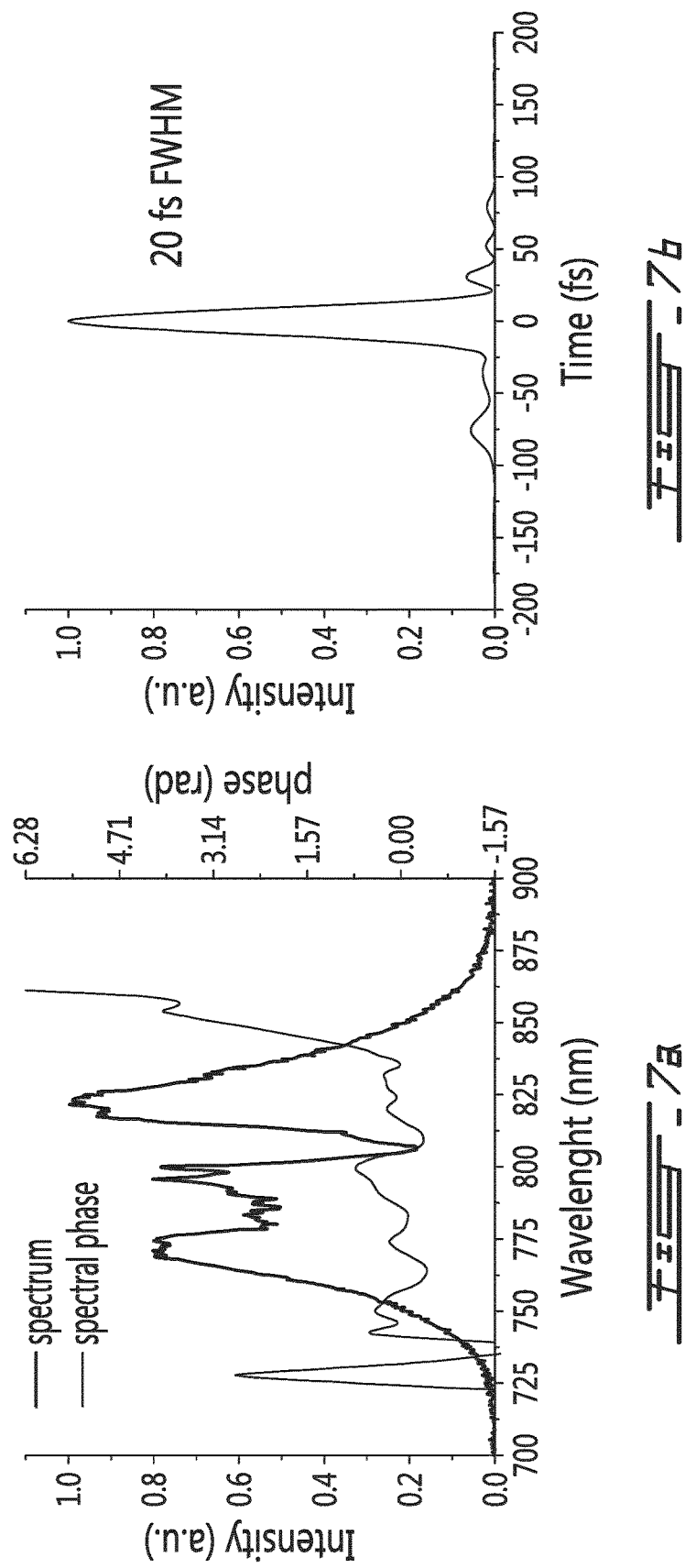

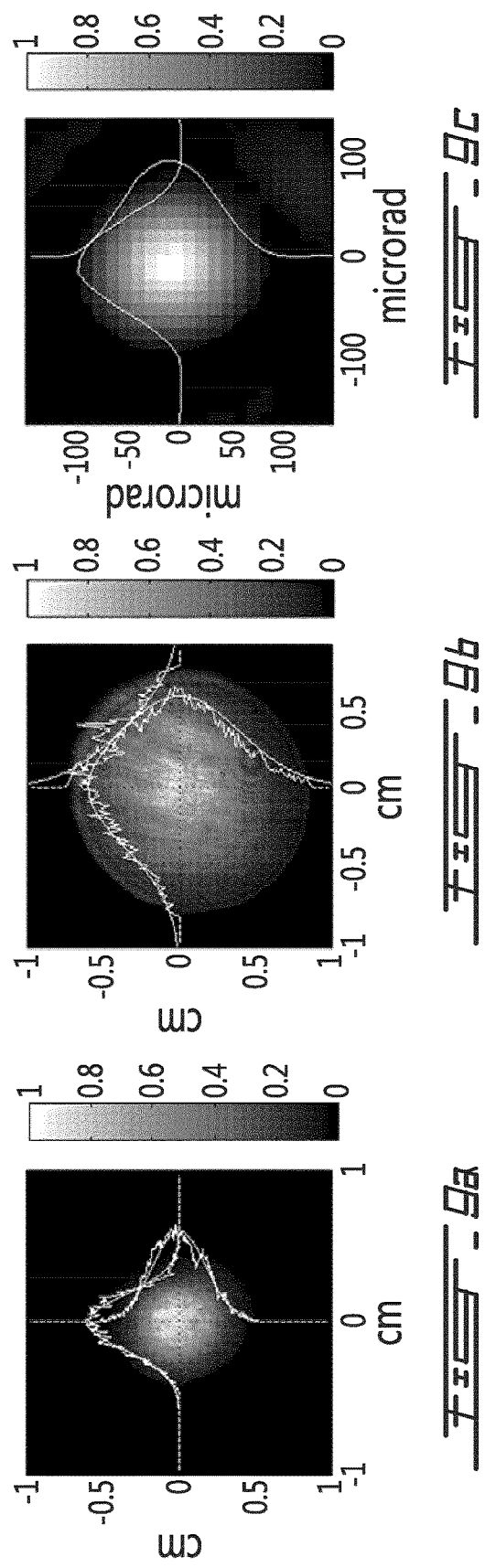

SYSTEM AND METHOD FOR HIGH-INTENSITY ULTRASHORT PULSE COMPRESSION

CROSS-REFERENCE TO RELATED APPLICATIONS

This application is a National Phase Entry Application of PCT application no. PCT/CA2014/050005 filed on Jan. 6, 2014, and published in English under PCT Article 21(2), which itself claims benefit of U.S. provisional application Ser. No. 61/750,618, filed on Jan. 9, 2013. All documents above are incorporated herein in their entirety by reference.

FIELD OF THE INVENTION

The present invention relates to femtosecond laser technology. More specifically, the present invention is concerned with a system and a method for high-intensity ultrashort pulse compression.

BACKGROUND OF THE INVENTION

In current titanium-sapphire high-intensity laser systems, and more particularly lasers with peak intensity exceeding the terawatt level, the pulse duration has not reached the physical limit yet. As it is common for lower intensity femtosecond lasers to produce few-cycle pulses, i.e. typically less than three optical cycles, the methods used to reach this regime are still not adapted to more energetic lasers which could benefit from a reduction in pulse duration.

In the state of the art, an ultrashort pulse coming out of a titanium-sapphire amplifier undergoes a nonlinear process, which allows further decreasing the pulse duration at the output of the laser system. Typically, a 25 fs pulse with a few mJ of energy at a central wavelength of 800 nm is propagated inside a meter-long hollow fiber filled with a noble gas and the interaction of the laser pulse with the gas creates new spectral components, thus broadening the laser spectrum. Then, by using an appropriate dispersive line to compensate for the delay between the different spectral components, it is possible to obtain pulses as short as 5 fs with up to 5 mJ energy [1]. Another version of this method is to replace the propagation through the noble gas by propagation through a bulk nonlinear medium [2,3], which allows avoiding guidance of the laser beam since the nonlinearity is typically 1000 times more important than for a gas medium.

The hollow fiber method is widely spread but cannot be used for terawatt-class and above femtosecond lasers, since the coupling of such a high intensity laser beam inside the fiber would inherently damage the fiber.

In the case of propagation inside a bulk medium, previous results have shown that the spectral broadening is not constant across the beam profile. The reason is that the laser beam has a Gaussian intensity profile. The nature of the nonlinear process leads to a broader spectrum for the central part of the beam than for the wings of the beam, which is of concern for the quality of the pulse compression. In order to homogenize the spectrum across the beam profile, it was proposed to focus the laser beam and place a spatial filter somewhere close to the focal plane. This solution yields a constant spectrum but the spatial filter damage threshold is still limiting the energy scalability. Another problem is that the spatial filter typically has only 50% throughput, resulting in a loss of half of the energy.

SUMMARY OF THE INVENTION

More specifically, in accordance with the present invention, there is provided a system comprising a laser emitting an ultrashort pulse beam; and a dielectric bulk medium having a refractive index depending on intensity, the bulk medium broadening the laser beam homogeneously versus transversal spatial coordinates.

There is further provided a non-linear system for homogeneous spectrum broadening of 3D Gaussian optical pulses, comprising a defocusing biconcave lens followed by a 90 degree off-axis parabolic mirror, wherein the lens has a thickness, at a radial position corresponding to 1/e of the beam energy, e times higher than a thickness at a central part of the lens, e being the Euler's number.

There is further provided a method for compressing high energy femtosecond laser pulses, comprising propagating the laser beam inside a dielectric bulk medium having a refractive index depending on the beam intensity, the bulk medium broadening the laser beam homogeneously versus transversal spatial coordinates; and compressing a resulting broadened spectrum.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 6 shows beam profiles after nonlinear propagation in lens and off-axis parabolic mirror;

FIG. 7 show a) spectrum and spectral phase in center of beam obtained with 30 mJ after nonlinear propagation and chirped mirrors; b) reconstructed pulse;

FIG. 9 show the intensity distribution in the nearfield before a) and after b) telescope, cross sections and Gaussian approximation of fundamental beam, c) far field of the beam after the telescope;

DESCRIPTION OF ILLUSTRATIVE EMBODIMENTS

The present invention is illustrated in further details by the following non-limiting examples.

There is provided a method and a system for generating a constant spectral broadening across a beam profile. In the following, a Gaussian beam profile will be used for illustration purposes.

The system uses a specific optics that allows obtaining constant spectral broadening across the Gaussian beam profile without focusing the beam.

The specific optics is a dielectric, centrosymmetric bulk medium with refractive index depending on intensity. Its shape is selected depending on the intensity profile in order to keep the product of the laser intensity and propagation distance through the medium constant.

Figure 2:
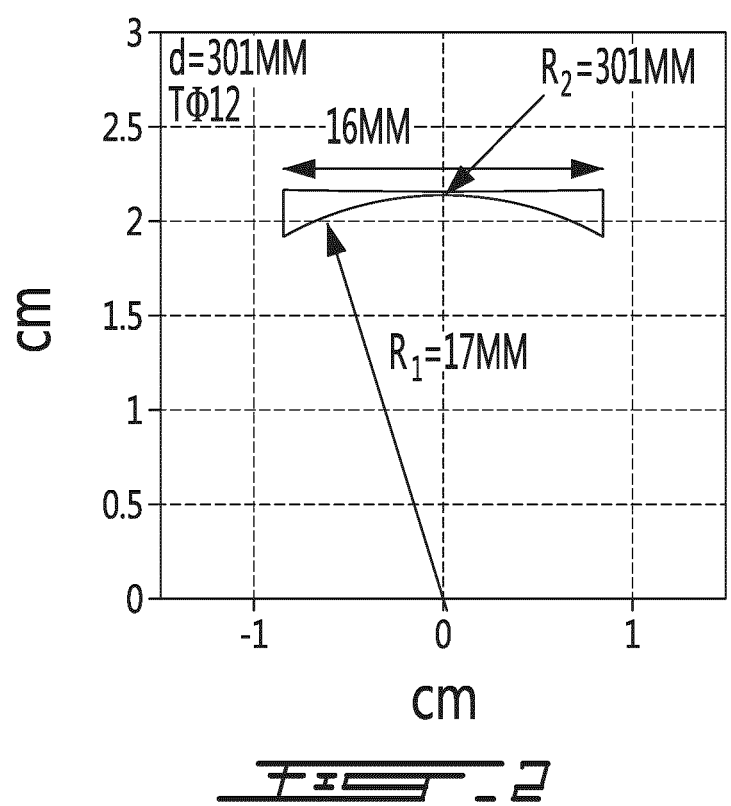
FIG. 2 shows a section of a lens used in relation to the profile of FIG. 1, according to an embodiment of an aspect of the present invention.

A diverging lens, as illustrated in FIG. 2, thin in the center and thick at the edge, with spherical curvatures selected according to the laser beam profile such that the product of lens thickness with the laser intensity remains constant may be used.

This nonlinear bulk medium is selected to be transparent to the propagated and generated wavelengths.

The system comprises a laser system allowing a laser intensity high enough to induce spectrum broadening without focusing the beam inside the nonlinear medium. The laser intensity is kept under the damage threshold of the different components.

The spectrum of the laser pulse is broadened homogeneously versus transversal spatial coordinates after the propagation inside the specific optics. The linear dispersion inside the bulk medium is negligible or its influence can be completely corrected for using a dispersive line as described hereinbelow.

Following the bulk medium, a conjugated optics is used to correct for the beam divergence or to modify the beam size, so as to yield a collimated beam. Chirped mirrors are used to produce temporal compression of pulses with broadened spectrum.

The system further comprises a dispersive line with anomalous dispersion. It comprises an optical device in which the shorter wavelengths travel a shorter distance. It can be, for instance, a combination of gratings or chirped mirrors.

The dispersion is compensated without introducing additional nonlinearity, either by using reflective components, changing the beam size or using appropriate materials presenting low nonlinear properties. If necessary, the system is kept under vacuum or in a gas environment such as helium so the beam can propagate without nonlinear interaction with air.

The present system allows decreasing the pulse duration at the output of terawatt-class and above femtosecond lasers.

The observation of the spectral broadening is related to the well-known Kerr effect which represents the variation of the refractive index when a high intensity laser pulse propagates through a dielectric material such that $n(t)=n_0+n_2I(t)$. The temporal dependence of the refractive index leads to the creation of new angular frequencies as the electric field oscillations inside the nonlinear material deviate from those in free-space propagation. In the following, the factor $\beta$ is the maximal deviation of the temporal phase due to the intensity dependence of the refractive index, also known as the B-integral. This parameter $\beta$ depends on the nonlinear index $n_2$, peak intensity $I_0$, central wavenumber $k_0$ and total propagation z through $\beta=n_2k_0I_0z$. If considering a Gaussian pulse propagation, it is possible to relate the parameter $\beta$ with the maximal and minimal observed wavelength, $\lambda_1$ and $\lambda_2$ for a given full-width half-maximum (FWHM) pulse duration $\tau_{FWHM}$ through $$\beta = \tau_{FWHM}\pi e^{1/2}\sqrt{\frac{1}{8\ln 2}}\left(\frac{1}{\lambda_2}-\frac{1}{\lambda_1}\right),$$

e being the Euler's number, approximately equal to 2.71. It means that the spectrum broadening is in direct relation with the parameter $\beta$ which in turn is directly proportional to the product of $n_2k_0I_0z$.

Figure 1B:
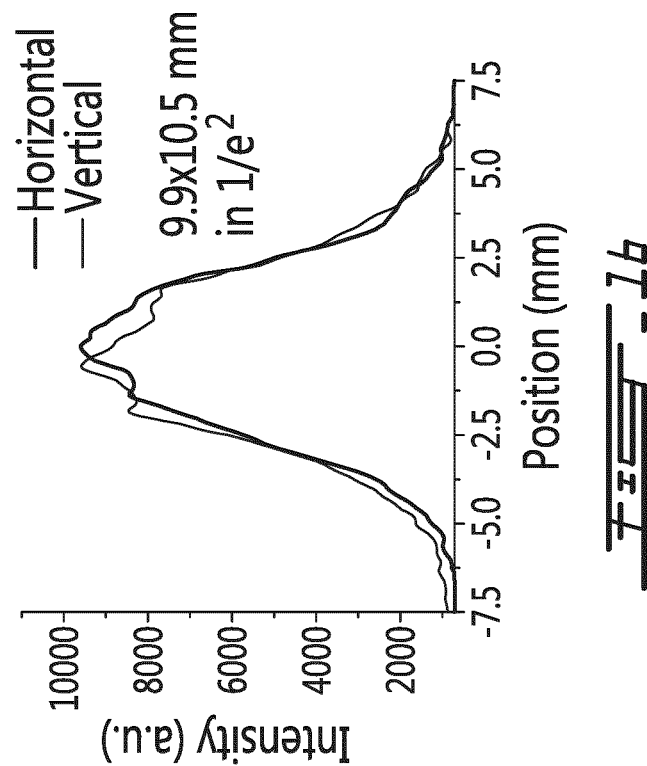
FIG. 1 a show a) an image of a Gaussian profile, and b) a graph of intensity versus position of the Gaussian profile of a femtosecond Ti:Sa laser with two amplification lines, at 10 Hz and at 100 Hz respectively, used in an experiment according to an embodiment of an aspect of the present invention.
Figure 1A:
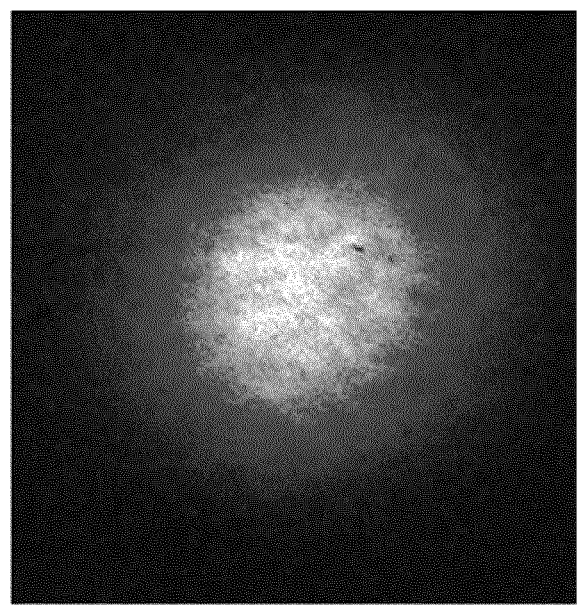

A lens was designed specifically for a given laser profile at the compressor output shown in FIG. 1 for example.

The laser used was a femtosecond Ti:Sa laser with two amplification lines, at 10 Hz and at 100 Hz respectively. For practical reasons, the 10 Hz line was chosen and the special lens was designed accordingly to the specific parameters of this laser. This beam line has two additional amplification stages following the regenerative amplifier but the last amplifier was bypassed during the experiment. The laser parameters of interest are a) energy per pulse after gratings compressor: 30 mJ, b) beam size: about 10 mm diameter in $1/e^2$, e being the Euler's number, with an almost ideal Gaussian shape so that the peak intensity $I_0$ in those conditions is 49 GW/cm$^2$ per mJ of energy, c) pulse duration: 40-45 fs. The laser Gaussian beam profile is shown in FIG. 1.

The lens was made so that the product of the thickness thereof by the laser intensity is constant across the beam, resulting in an expected constant B-integral and constant spectral broadening. This way, the radial position corresponding to 1/e of the energy, e being the Euler's number as mentioned hereinabove, is e times thicker than the central part of the lens, for a Gaussian beam profile.

FIG. 2 shows the specific design of a lens for the laser beam of FIG. 1 used in this experiment.

Figure 3:
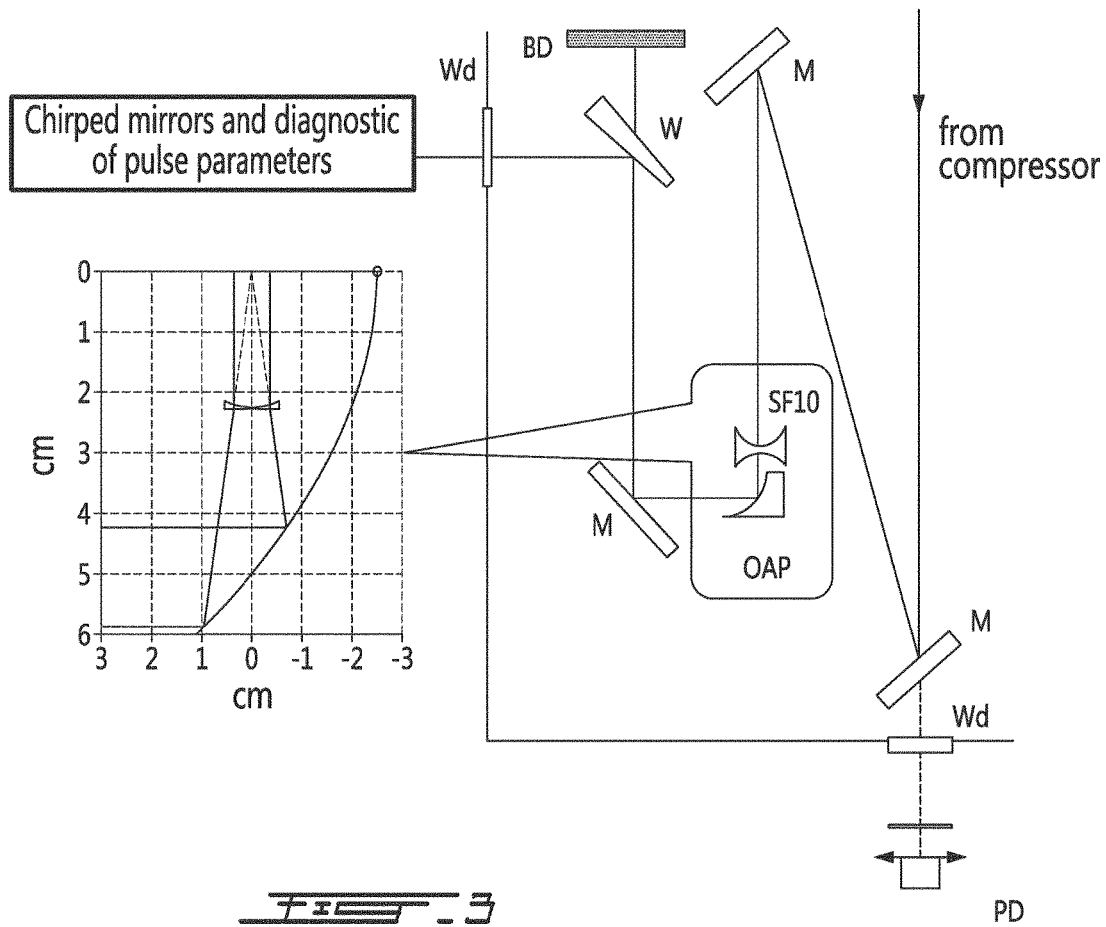
FIG. 3 is an experimental system for pulse post-compression according to an embodiment of an aspect of the present invention.

FIG. 3 shows a system to collimate the beam after its propagation through the diverging lens of FIG. 2, where BD: beam dump; M: mirror; OAP: off-axis parabolic mirror; PD: photodiode; SF10: bi-concave lens; W: wedge; Wd: window. An off-axis parabola OAP with effective focal length of 50.8 mm was placed after the lens made of SF 10, thereby forming a so-called telescope.

Figure 4:
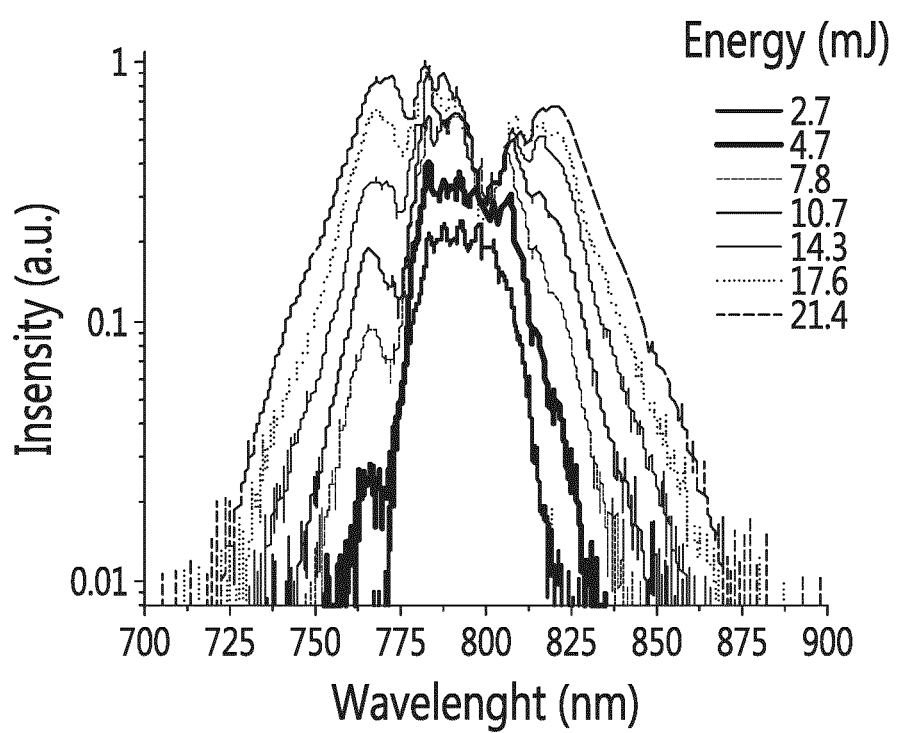
FIG. 4 shows spectral broadening observed in the center of the lens of FIG. 3.
Figure 5B:
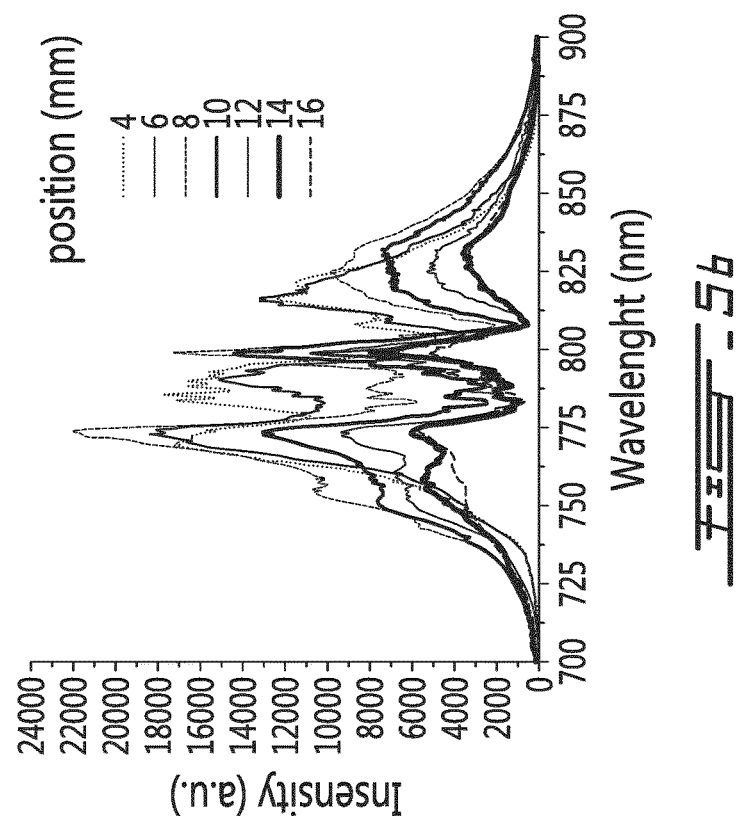
FIG. 5 show spectra measured across the beam with a) 21.4 mJ; b) 30.8 mJ.
Figure 5A:
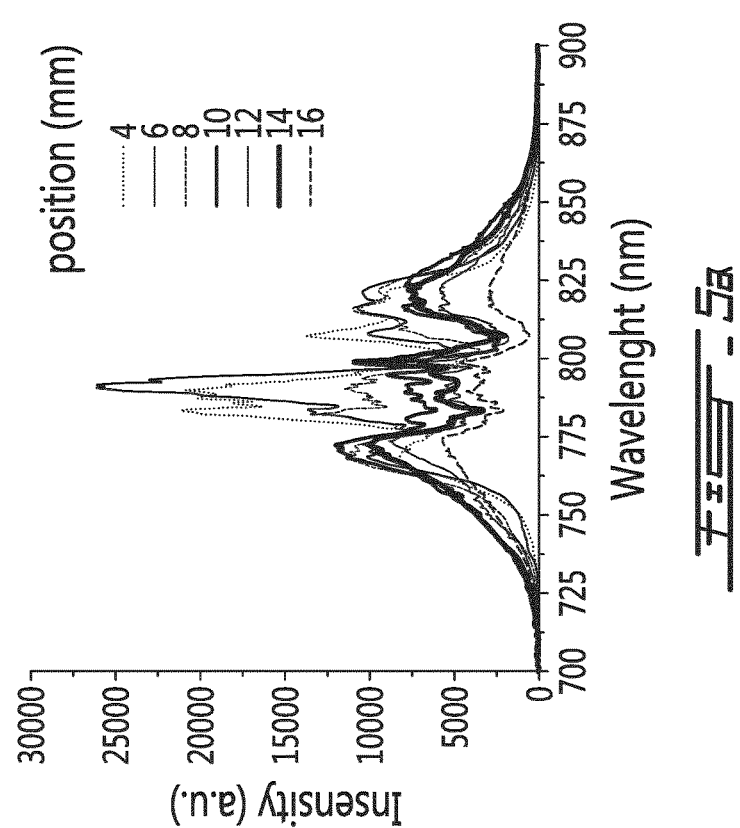

In order to avoid nonlinear interaction with air, the optical setup was installed inside a vacuum chamber. During the experiment, the beam was propagated inside two different bulk media, i.e. a glass plate and the lens of the present invention, in order to observe different conditions for nonlinear propagation. The reflexion from a wedge W allowed sampling the beam out of the vacuum chamber through a 2 mm thick fused silica window Wd without undergoing significant additional nonlinearity (see FIG. 3). It was then possible to characterize the laser spectrum, beam profile and pulse duration at atmospheric pressure. In these conditions, it was possible to observe the spectral broadening for different pulse energies by propagation through a 3 mm fused silica parallel plate, and through the 0.2 mm thick center of the lens made of SF10 (FIG. 4). It was also possible to observe the spectrum across the beam by moving the spectrometer on a translation stage (FIG. 5).

Spectra were measured for different energies in the center of beam (FIG. 4) and also across the beam (FIG. 5) for a fixed energy. As can see from FIG. 4, even if the lens is relatively thin in the center (200 microns), the B-integral is quiet important. This is because the material used for the lens, SF10, has a much larger $n_2$ than fused silica. It could be evaluated that the B-integral can reach a value as high as 6 with the lens in those conditions. The spectral broadening on the wings is very similar to the one in the center of the lens. It seems, according to those results, that the lens allows a constant B-integral across the beam profile.

The beam profile was measured for different energies (FIG. 6). Again, it seems that the nonlinear propagation degrades the quality of the nearfield for high values of β. The dimension of the beam after the telescope (i.e. the lens followed by off-axis parabola OAP) is about 18 mm in diameter at $1/e^2$ of the maximum intensity so the size of the beam is almost doubled with the geometry in this experiment.

Pulse was compressed by using chirped mirrors 12 pairs of reflexions were used (group velocity dispersion (GVD)=−600 $fs^2$) (see FIG. 7). The pulse could also be compressed by propagation inside a medium or optical system where a longer wavelength is delayed as compared with a shorter wavelength. Such medium could be for example a gas, a plasma or a given type of glass. Alternatively, an optical system could be made with one or more gratings with a given geometry such that the pulse dispersion can be compensated.

Figures 8A, 8B:
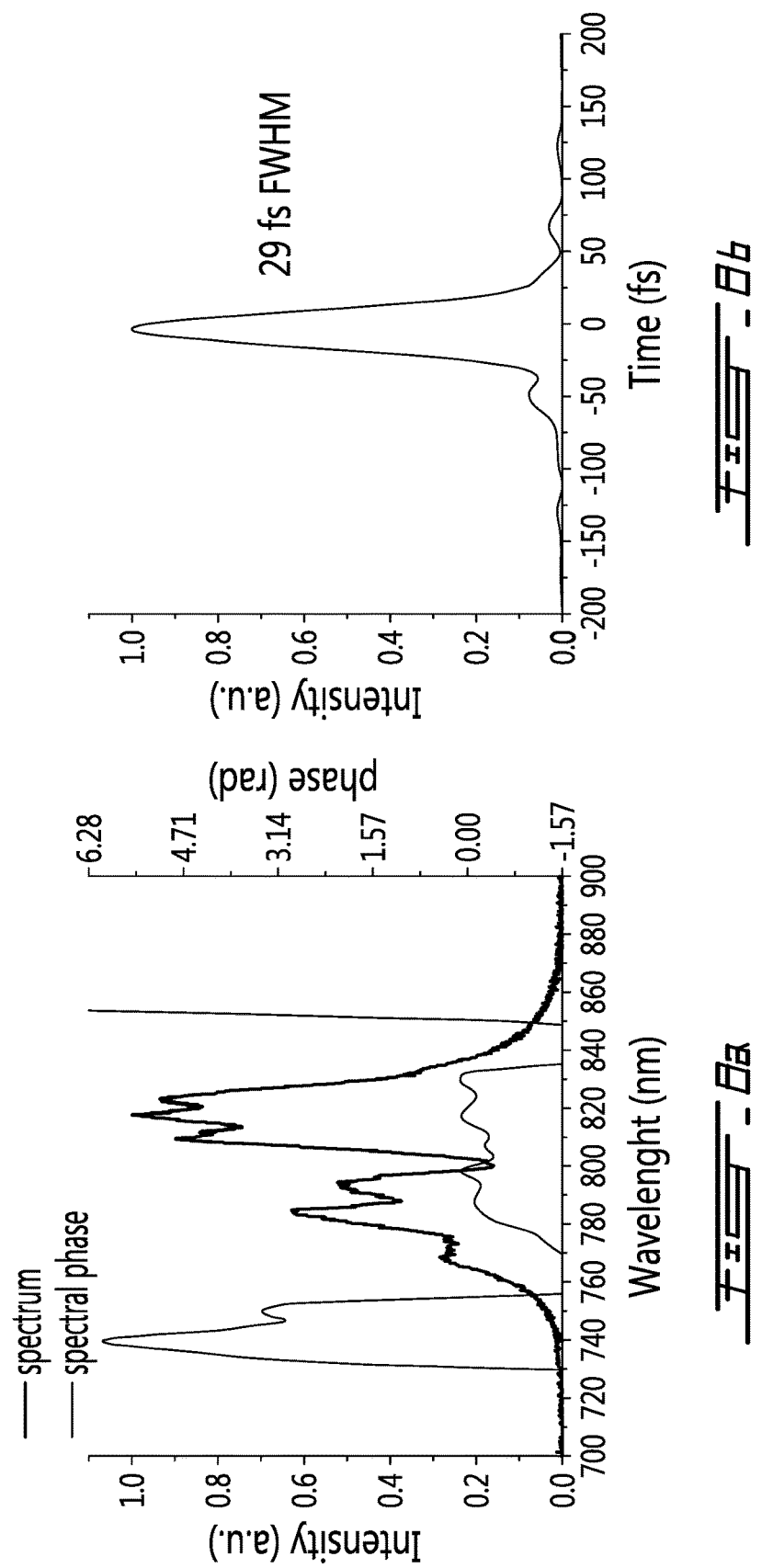
FIG. 8 show a) spectrum and spectral phase 7 mm off-center obtained with 30 mJ after nonlinear propagation and chirped mirrors; b) reconstructed pulse.

FIG. 8 show the pulse duration taken 7 mm off-center of the beam. The measurement reveals that the off-center pulse duration is longer than the pulse duration in the center. The nature of the phenomenon is based on the fact that the design of the defocusing lens does not allow obtaining uniform B-integral accumulation for all transverse coordinates. The geometry of the lens was calculated to obtain quasi-uniform B-integral (less than 10% with exactly know cubic nonlinearity parameter) for the beam radii on the level $e^{-1}$ of the peak intensity and 7 mm exceeds the scale significantly.

A primary goal of the experiment was to demonstrate the possibility of decreasing the duration of a high energy femtosecond pulse by using self-phase modulation and compression with chirped mirrors. By propagating the femtosecond laser beam through parallel plates of 1 and 3 mm fused silica, the B-integral was expected to depend on the position in the beam because of the modulation of the intensity due to the Gaussian. The experimental results of spectral broadening were compared with numerical calculations and some behaviors depending on the pulse initial GVD and/or total amount of B-integral were observed. Good matching between experimental results and numerical calculations was obtained.

It was then possible to compress the pulse duration at a fixed position in the beam by compensating the spectral phase with chirped mirrors. In practice, it was noticed that the quality of the spectral phase is essential in order to reach this theoretical limit. Also, as high values of β lead to spatial profile degradation, β should not reach higher values than 3. In practice, the pulse duration could be divided by a factor between 1.5 and 2.2.

A solution to the inhomogeneous spectral broadening due to the variation of the B-integral when propagating a Gaussian beam through a parallel glass plate was obtained. It was demonstrated that using a diverging lens with a proper design allows keeping a constant B-integral across the beam profile. A constant spectral broadening when measuring the spectrum at different positions across the beam was observed.

It was thus demonstrated the possibility of using bulk materials in order to compress high energy femtosecond laser pulses. The compression of 40-45 fs pulses down to 20 fs with energies up to 30 mJ was achieved by propagating the pulse inside two different nonlinear materials, i.e. fused silica and SF10. The self-phase modulation technique was used to compress a pulse with energy as high as 30 mJ. Since this solution does not involve focalization of the beam, it is scalable to larger beams with more energy. Also, very high energy throughput can be obtained by using proper anti-reflexion coatings for the lens and high-reflectivity coatings for the reflective optics. Considering available commercial coatings, throughput higher than 95% of the incident energy can be expected.

Theoretical and experimental results of implementation of the original technique of quasi uniform recompression of 3D Gaussian intense (TW/$cm^2$) femtosecond optical pulses from 40 fs to 20 fs will now be presented. Experimental set up and the basic concept is depicted on the FIG. 3.

The spectrum broadening of intense radiation in glasses occurs as a result of generation of cubic polarization waves at the same frequency like a fundamental. The modification of initial pulse parameters can be described in the frame of the second estimation of the dispersion theory taking into account cubic nonlinearity and its nonstationarity:

$$\frac{\partial A}{\partial z} + \frac{1}{u}\frac{\partial A}{\partial t} - i\frac{k_2}{2}\frac{\partial^2 A}{\partial t^2} + i\gamma_1|A|^2 A + \frac{3\pi \cdot \chi^{(3)}}{n \cdot c}\frac{\partial}{\partial}(|A|^2 A) = 0$$

Here A(t−z/u, z) complex amplitude of electric field, $\gamma_1 = (3\pi \cdot k \cdot \chi^{(3)})/(2 \cdot n^2)$, $\chi^{(3)}$—cubic nonlinearity, u—group velocity, n—refractive index, c—speed of light, z—longitudinal coordinate, $$k_2 = \left.\frac{\partial^2 k}{\partial \omega^2}\right|_{\omega_0}$$

the linear material dispersion, which is responsible for pulse broadening in the medium with a dispersion of refractive index, k—wave vector. The typical spatial scale where the effect starts to play significant role can be defined as $T^2/|k_2|$. Even for FWHM 20 fs Gaussian pulses and glass with huge dispersion parameter—heavy flint 12 (analog SF10) the scale is 1.8 mm.

In the frame of the approximation the spectrum broadening is determined by a value of B-integral:

$$B(r, t) = \frac{2\pi}{\lambda}\gamma_2 \cdot \int_0^L I(r, t, \xi)d\xi$$

For 3D Gaussian pulses a spatial intensity distribution depends on transversal coordinate r, like i=Io·exp(−$r^2/R_\perp^2$−4 ln(2)$t^2/T^2$). In the case, when the nonlinear medium is a plane parallel glass plate, the center of the beam accumulates in e times more value of B-integral in comparison with the wings on the $e^{-1}$ level. The spectrum broadening is different across the beam and the recompression of the pulse by means of the reflection from chirped mirrors produces inhomogeneous distribution of pulse duration versus transversal coordinate r.

The quasi homogeneous spectrum broadening for 3D Gaussian optical pulses can be obtained by implementation of a "nonlinear telescope". The telescope consists of a defocusing biconcave lens and 90 degree off-axis parabolic mirror. The method how the lens can be calculated for Gaussian beams is thoroughly explained in Mironov, S. Y., et al., *Compression of femtosecond pulses with a Gaussian temporal and spatial intensity distribution*. Quantum Electronics, 2013. 43(8): p. 711. The general idea is to save the value of the product result I(r)×L(r) per variation of radii of curvature of the entrance and output lens surfaces. The thickness in the center should be chosen from a desired value of accumulated B-integral.

The technique was verified experimentally. The optical radiation has the following parameters: central wavelength 800 nm, pulse duration 40-45 fs, energy up to 28 mJ, the spatial distribution of intensity is Gaussian with radius on the level $e^{-1}$ of max intensity. The beam profiles in the near and far fields before and after the telescope, its cross sections and Gaussian approximation are presented on the FIG. 9. The telescope was placed in a vacuum chamber to exclude air influence on intense optical radiation. The radii of entrance and output surfaces of the defocusing lens are 16.8 mm and 299 mm, the thickness on the optical axe is 0.2 mm. The type of glass, which was used for lens production, is heavy flint 12. The cubic nonlinearity for the type is unknown parameter, but it can be estimated in accordance with an empiric formula presented in [10], which gives a result $\gamma_2=2.2 \cdot 10^{-6}$ cm$^2$/GW. The formula provides systematic higher values (more than 30%) for glasses with nonlinearity more than $3.5 \cdot 10^{-7}$ cm$^2$/GW [11]. For numerical simulations was used value $\gamma_2=9 \cdot 10^{-7}$ cm$^2$/GW, which gives a good agreement between theoretical and experimental spectrum broadening. The value is about four times more the one of fused silica. The type of glass was chosen to increase spectrum broadening, but it has a big dispersion parameter $k_2=223$ fs$^2$/mm in comparison with fused silica 36.7 fs$^2$/mm. The large dispersion could result in the pulse front tilt. The temporal aberration can be corrected in accordance with the method proposed in Bahk, S.-W., et al. *An Off-Axis, Single-Pass, Radial-Group-Delay Compensator Design Using an Offner Triplet for a Broadband OPCPA Laser*. in CLEO: 2013. 2013. San Jose, Calif.: Optical Society of America, which should be realized in linear regime only.

The beam with broaden spectrum was reflected from a wedge in vacuum chamber and sent through a 2 mm window to the recompression stage and the system of diagnostic of spectral-temporal parameters, which were under air condition. The recompression stage consisted of 3 pairs of chirped mirrors. The beam was four times reflected from each pair. The total negative chirp of the recompression stage is −600 fs$^2$.

Figure 10:
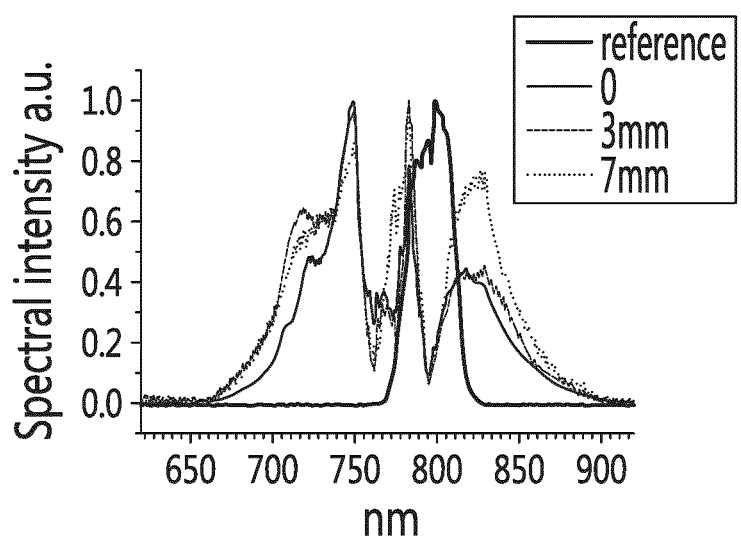
FIG. 10 shows spectral intensities of reference pulse and the pulse with broadened spectrum in the center of beam (0), 3 mm and 7 mm from center.
Figure 11B:
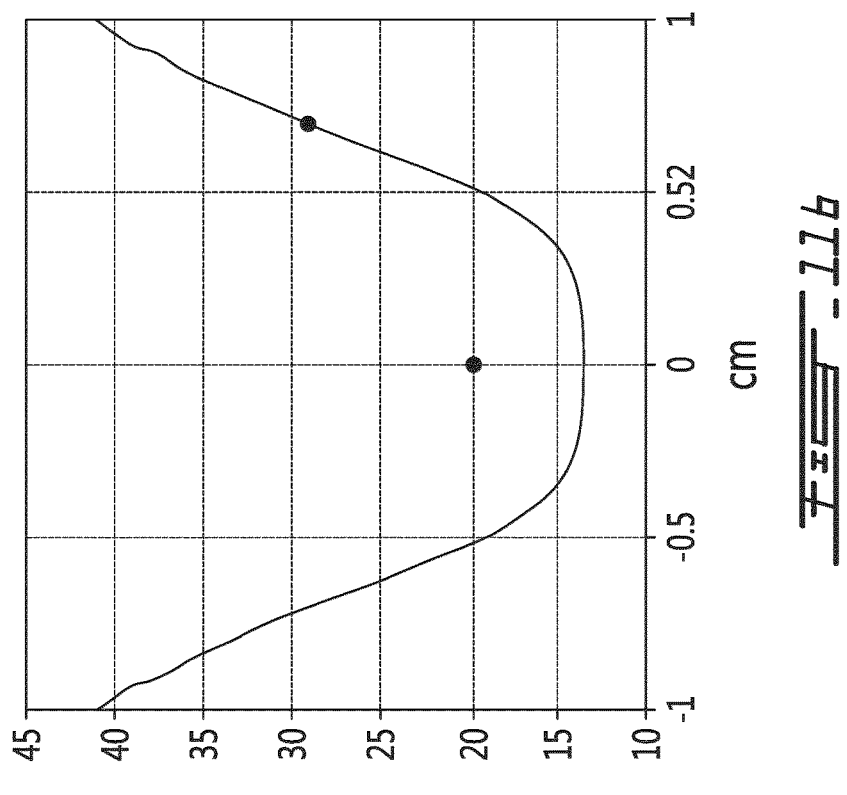
FIG. 11 show a) measured intensity profiles of the reference pulse (before the telescope), after the recompression stage in the center of the beam and 7 mm aside; b) results of 3D numerical simulation of pulse duration (solid curve) and experimentally measured points.
Figure 11A:
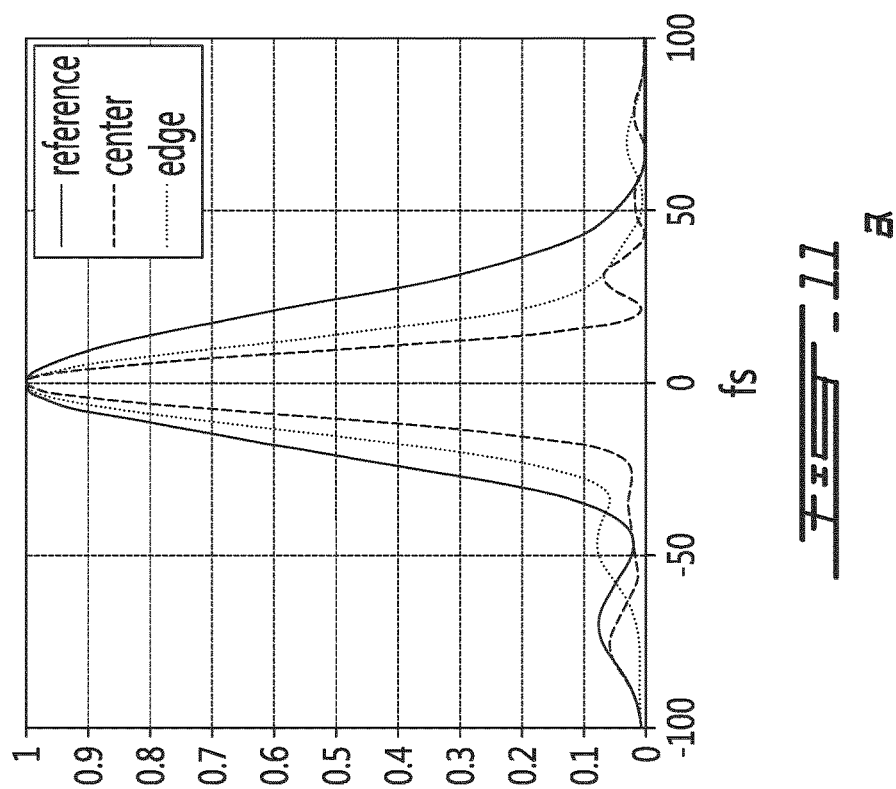

The measured spectral intensities of the reference pulse and the one after the telescope in different positions across the beam are presented on the FIG. 10. As shown in FIG. 10, the nonlinear telescope allows broadening spectrum across the Gaussian beam quasi homogeneously. The spectral temporal characteristics of the reference and the recompressed pulses were measured by spectrometer and SPIDER in the center of the beam and 7 mm horizontally aside, the results are presented on the FIG. 11a. It clearly demonstrates that the pulse duration was reduced in more than two times from 45 fs down to 20 fs in the center of the Gaussian beam. The measured pulse duration on the edge is 29 fs. The disagreement between experimentally measured points in the center of the beam with the theoretical curve (see FIG. 11b) can be explained by not full spectral phase correction in the experiments, as far as the Fourier transforms limited pulse duration, which corresponds to the measured broadened spectrum in the center of the beam is 14 fs.

3D numerical simulations shows that the accumulated value of B-integral in the defocusing lens exceeds 4.5 and its variation on the beam radius is not more than 25% for the 28.4 mJ of the fundamental beam. The deviation can be decreased down to 10% on the beam radius if the value of the cubic nonlinearity is known exactly.

The present system can be scaled to unpreceding energy levels for femtosecond pulse compression down to the few-cycle regime. Moreover, the system can transmit more than 95% of the initial energy providing using appropriate coatings for the optics. For example multiple layers dielectrics mirrors can reflect more than 99.5% of incident light as well as properly designed dielectrics anti-reflection coatings can reduce the Fresnel losses to less than 1% for optical components used in transmission. By using optics with anti-reflection or highly reflective coatings designed for a specific laser beam, the loss of energy of a system proposed herein can be less than 1% for each optic composing the system. Thus, for a system comprising two lens and two chirped mirrors, the overall throughput could be higher than 95%.

The present system can be used to increase the peak power by a factor more than two in an ultrashort pulse laser system. For example, a chain of amplifiers designed to produce 1 petaWatt peak power could be up-scaled to 2 or 3 petaWatts with much lower cost than building an additional amplifier. The interest for increasing the power of lasers is to explore physical mechanisms at intensity level never reached before. For example, the interaction with solid target could lead to the acceleration of ions at relativistic energies. Also, reaching high enough intensity could also lead to nonlinear interaction with vacuum such as four-wave mixing, which would reveal fundamental constants in physics.

The scope of the claims should not be limited by the embodiments set forth in the examples, but should be given the broadest interpretation consistent with the description as a whole.

REFERENCES

1. Yu, T. J., et al., Generation of high-contrast, 30 fs, 1.5 PW laser pulses from chirped-pulse amplification Ti:sapphire laser. Opt. Express, 2012. 20(10): p. 10807-10815.
2. Naumova, N. M., et al., *Relativistic Generation of Isolated Attosecond Pulses in a $\lambda^3$ Focal Volume*. Physical Review Letters, 2004. 92(6): p. 063902.
3. Schmid, K., et al., *Few-Cycle Laser-Driven Electron Acceleration*. Physical Review Letters, 2009. 102(12): p. 124801.
4. Shank, C. V., et al., *Compression of femtosecond optical pulses*. Applied Physics Letters, 1982. 40(9): p. 761-763.
5. R. L. Fork, C. H. B. C., P. C. Becker and C. V. Shank, *Compression of optical pulses to six femtoseconds by using cubic phase compensation*. Optics Letters, 1987. 12(7): p. 483-485.
6. Nisoli, M., S. D. Silvestri, and O. Svelto, *Generation of high energy 10 fs pulses by a new pulse compression technique*. Applied Physics Letters, 1996. 68(20): p. 2793-2795.

7. Akira, S., et al., Generation of sub-10-fs, 5-mJ-optical pulses using a hollow fiber with a pressure gradient. Applied Physics Letters, 2005. 86(11): p. 111116.
8. Akturk, S., et al., High-energy ultrashort laser pulse compression in hollow planar waveguides. Opt. Lett., 2009. 34(9): p. 1462-1464.
9. Chen, X., et al., Generation of 4.3 fs, 1 mJ laser pulses via compression of circularly polarized pulses in a gas-filled hollow-core fiber. Opt. Lett., 2009. 34(10): p. 1588-1590.
10. Dutin, C. F., et al., Post-compression of high-energy femtosecond pulses using gas ionization. Opt. Lett., 2010. 35(2): p. 253-255.
11. Rolland, C. and P. B. Corkum, *Compression of high-power optical pulses.* J. Opt. Soc. Am. B, 1988. 5(3): p. 641-647.
12. Mével, E., et al., Extracavity compression technique for high-energy femtosecond pulses. J. Opt. Soc. Am. B, 2003. 20(1): p. 105-108.
13. Siegman, A. E., *Lasers.* 1986: Univ. Science Books, p. 332.
14. Boyd, R. W., *Nonlinear Optics.* 2003: Elsevier Science, p. 212.
15. Mironov, S. Y., et al., *Compression of femtosecond pulses with a Gaussian temporal and spatial intensity distribution.* Quantum Electronics, 2013. 43(8): p. 711.
16. Bahk, S.-W., et al. *An Off-Axis, Single-Pass, Radial-Group-Delay Compensator Design Using an Offner Triplet for a Broadband OPCPA Laser.* in CLEO: 2013. 2013. San Jose, Calif.: Optical Society of America.

The invention claimed is:

1. A system, comprising:
a laser emitting an ultrashort pulse beam; and
a dielectric bulk medium having a refractive index depending on intensity, said bulk medium broadening the laser beam homogeneously;
wherein said bulk medium has a varying thickness such that a product of a thickness of the bulk medium by the laser beam intensity is constant across the beam.

2. The system of claim 1, wherein said bulk medium is selected to be transparent to propagated and generated wavelengths.

3. The system of claim 1, further comprising a conjugated optics collimating the laser beam after its propagation through the bulk medium.

4. The system of claim 3, further comprising chirped mirrors to compress the broadened spectrum to a shorter pulse.

5. The system of claim 3, further comprising a medium delaying longer wavelengths of the broadened spectrum.

6. The system of claim 1, installed inside a vacuum chamber.

7. The system of claim 1, kept in an inert gas environment.

8. The system of claim 1, wherein said laser is one of: a terawatt and above femto second laser.

9. A system, comprising:
a laser emitting an ultrashort pulse beam; and
a dielectric bulk medium having a refractive index depending on intensity, said bulk medium broadening the laser beam homogeneously;
wherein the beam of said laser has a Gaussian profile and said bulk medium is a lens having a varying thickness selected so that it has, at a radial position corresponding to 1/e of the beam energy, a thickness e times higher than a thickness at a central part of the lens, e being the Euler's number.

10. The system of claim 9, further comprising an off-axis parabola placed after said lens.

* * * * *